US008498633B2

(12) United States Patent
Li

(10) Patent No.: US 8,498,633 B2
(45) Date of Patent: Jul. 30, 2013

(54) METHOD, SYSTEM AND DEVICE FOR INITIALIZING INTERNET DEVICE

(75) Inventor: Fei Li, Shenzen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/575,279

(22) PCT Filed: Nov. 24, 2010

(86) PCT No.: PCT/CN2010/079095
§ 371 (c)(1),
(2), (4) Date: Jul. 25, 2012

(87) PCT Pub. No.: WO2011/116610
PCT Pub. Date: Sep. 29, 2011

(65) Prior Publication Data
US 2013/0012184 A1 Jan. 10, 2013

(30) Foreign Application Priority Data
Mar. 24, 2010 (CN) .......................... 2010 1 0140739

(51) Int. Cl.
*H04M 3/00* (2006.01)
*H04M 3/16* (2006.01)
(52) U.S. Cl.
USPC .......................................... 455/418; 455/411
(58) Field of Classification Search
USPC .................. 455/418; 714/769, 701, 768, 761, 714/762
See application file for complete search history.

(56) References Cited

U.S. PATENT DOCUMENTS

| 6,519,644 B1 | 2/2003 | Lindquist et al. |
| 2003/0037197 A1* | 2/2003 | Kim .............................. 710/305 |
| 2005/0036372 A1* | 2/2005 | Sasaki .......................... 365/202 |

FOREIGN PATENT DOCUMENTS

| CN | 1335012 A | 2/2002 |
| CN | 1964528 A | 5/2007 |
| CN | 101146064 A | 3/2008 |
| CN | 101409625 A | 4/2009 |

OTHER PUBLICATIONS

International Search Report mailed on Mar. 17, 2011 in PCT/CN2010/079095 in 4 pages.
Written Opinion of the International Searching Authority (date of completion Feb. 23, 2011) in PCT/CN2010/079095 in 3 pages.

* cited by examiner

*Primary Examiner* — Charles Appiah
*Assistant Examiner* — Emem Stephen
(74) *Attorney, Agent, or Firm* — Knobbe, Martens, Olson & Bear, LLP

(57) ABSTRACT

This disclosure discloses a method, system and device for initializing an internet device. The method mainly comprises: an application module queries, through a handshake negotiation with a communication module, network standard information, sends the hardware configuration information needed to the communication module, and then informs the communication module of the determined hardware configuration information; and the communication module initializes hardware devices according to the initialization operation information in a stored set of available initialization operation information matched with the hardware configuration information. This disclosure avoids the setting of different software versions corresponding to different hardware ports and parameter configurations and reduces the complexity of system maintenance and management. Besides, the application module can use the same set of codes to adapt to communication modules of different network standards, thus further reducing the complexity of system maintenance and management.

9 Claims, 3 Drawing Sheets

METHOD, SYSTEM AND DEVICE FOR INITIALIZING INTERNET DEVICE

CROSS-REFERENCE TO RELATED APPLICATIONS

This application is the U.S. National Phase application under 35 U.S.C. §371 of International Application PCT/CN2010/079095, filed Nov. 24, 2010, which claims priority to Chinese Application 201010140739.4, filed Mar. 24, 2010.

FIELD OF THE INVENTION

This disclosure relates to the field of communication, and in particular to a method, system and device for initializing an internet device.

BACKGROUND OF THE INVENTION

With the coming of the age of the third generation mobile communication, more and more internet devices such as net book, Mobile Internet Device (MID), Ultra-Mobile PC (UMPC) are used. A communication module that can be connected with a radio communication network can be built in or externally connected with these internet devices to meet the demands of the user for surfing the Internet, sending a short message and making a call at any place at any time. At present, as there are a plurality of communication network standards, communication modules also have a plurality of network standards, such as the Evolution-Data Optimized (EVDO) network standard for a Code Division Multiple Access (CDMA) network or a network standard for a Wideband Code Division Multiple Access (WCDMA) network.

In order to realize a plurality of functions including internet surfing and communications, an internet device generally has an application module therein to realize various service functions. As it is possible that communication modules have a plurality of network standards, the application module is required to set software versions for communication modules of different network standards in advance, and then an appropriate software version is selected according to the network standard of the communication module to be connected, and the AT command of the telecom service information matched with the network standard of the connected communication module is sent to the connected communication module. Contrarily, as each communication module may be applied to a plurality of internet devices with different hardware ports and parameter configurations, the communication module is required to set a plurality of kinds of software versions for different hardware ports in advance so that an appropriate software version can be selected according to the internet device connected.

In conclusion, as communication modules have many different network standards and the application modules in different internet devices have different hardware ports and parameter configurations, therefore, in order to guarantee a correct connection between a communication module and an application module, the communication module is required to maintain the software versions for different hardware ports and parameter configurations, which increases the workload of software development as well as the complexity of system maintenance and management.

SUMMARY OF THE INVENTION

In view of the problem above, a method, system and device for initializing an internet device are provided in the embodiments of this disclosure, to solve the problem existing in the conventional art that the workload of software development and the complexity of system maintenance and management are increased as a communication module is required to maintain software versions for different hardware ports and parameter configurations.

In order to solve the technical problem above, the technical solution of the embodiments of this disclosure is realized as follows:

a method for initializing an internet device comprises steps of: a communication module sending corresponding network standard information to an application module according to an AT query command received from the application module; the communication module receiving at least one piece of hardware configuration information from the application module, and determining, from a preset set of initialization operation information, initialization operation information matched with the received hardware configuration information; and the communication module performing an initialization operation according to the determined initialization operation information.

The method further comprises, before the communication module sending corresponding network standard information to the application module according to the AT query command received from the application module, steps of: the application module sending an AT test command set for connection to the communication module using a Universal Asynchronous Receiver/Transmitter (UART) port, and determining whether a response message is received from the communication module in a preset time; and if yes, sending an AT query command to the communication module using the UART port; if no, sending an AT query command to the communication module using a Universal Serial Bus (USB) port.

Sending the AT query command to the communication module using the USB port further comprises: the application module retransmitting the AT query command to the communication module using the UART port, and determining whether the retransmission times reaches a threshold, and if the threshold is reached and no response message is received, sending the AT query command to the communication module using the USB port.

A system for initializing an internet device comprises an application module and a communication module, wherein the application module is configured to send an AT query command to the communication module, and send at least one piece of hardware configuration information to the communication module after receiving the network standard information returned from the communication module;

and the communication module is configured to receive the AT query command, send corresponding network standard information to the application module, and, after receiving the hardware configuration information, determine, from a preset set of initialization operation information, the initialization operation information matched with the received hardware configuration information, and perform an initialization operation according to the initialization operation information.

The application module is further configured to: send an AT test command set for connection to the communication module using a UART port, determine whether a response message is received from the communication module in a preset time, and if yes, send an AT query command to the communication module using the UART port, if no, send an AT query command to the communication module using a USB port.

The application module is further configured to retransmit the AT query command to the communication module using the UART port, determine whether the retransmission times reaches a threshold, and if the threshold is reached and no response message is received, send the AT query command to the communication module using the USB port.

A communication device comprises:

a receiving module configured to receive an AT query command and at least one piece of hardware configuration information;

a sending module configured to send the network standard information corresponding to the communication device according to the received AT query command;

a determination module configured to determine, from a preset set of initialization operation information, the initialization operation information matched with the received hardware configuration information;

and an operation module configured to perform an initialization operation according to the determined initialization operation information.

The hardware configuration information above comprises at least one of: the number of the General Purpose Input/Output (GPIO) ports for connection between the application module and the communication module, effective level information, the connection/disconnection condition of the USB port when the internet device is in a sleep mode and voice channel information.

The embodiments of this disclosure have the following benefic effects:

In the embodiments of this disclosure, through a handshake negotiation between a communication module and an application module, the corresponding hardware configuration information is determined by the application module according to the network standard information of the communication module, and then informs the communication module of the determined hardware configuration information; and the communication module initializes hardware devices according to the initialization operation information in a stored set of available initialization operation information matched with the hardware configuration information. Therefore, the setting of software versions corresponding to different hardware ports and parameter configurations is avoided, and the workload of software development as well as the complexity of system maintenance and management is reduced. Meanwhile, as the application module can use the same set of codes to adapt to communication modules of different network standards, the complexity of system maintenance and management is further reduced.

DETAILED DESCRIPTION OF THE EMBODIMENTS

In the solution provided herein of initialization operations on an internet device, it is not required to set different software versions for different hardware ports and parameter configurations in a communication module, but all the initialization operations corresponding to available hardware configuration information are stored. During an initialization operation, a handshake negotiation is carried out between the communication module and an application module, and then a matched initialization operation is carried out according to the negotiated hardware configuration information. Thus, it realizes the initialization of the communication module without setting software versions in the communication module, and lowers the complexity of system maintenance and management.

The embodiments of this disclosure are described below in detail with reference to drawings.

Embodiment 1

Figure 1:
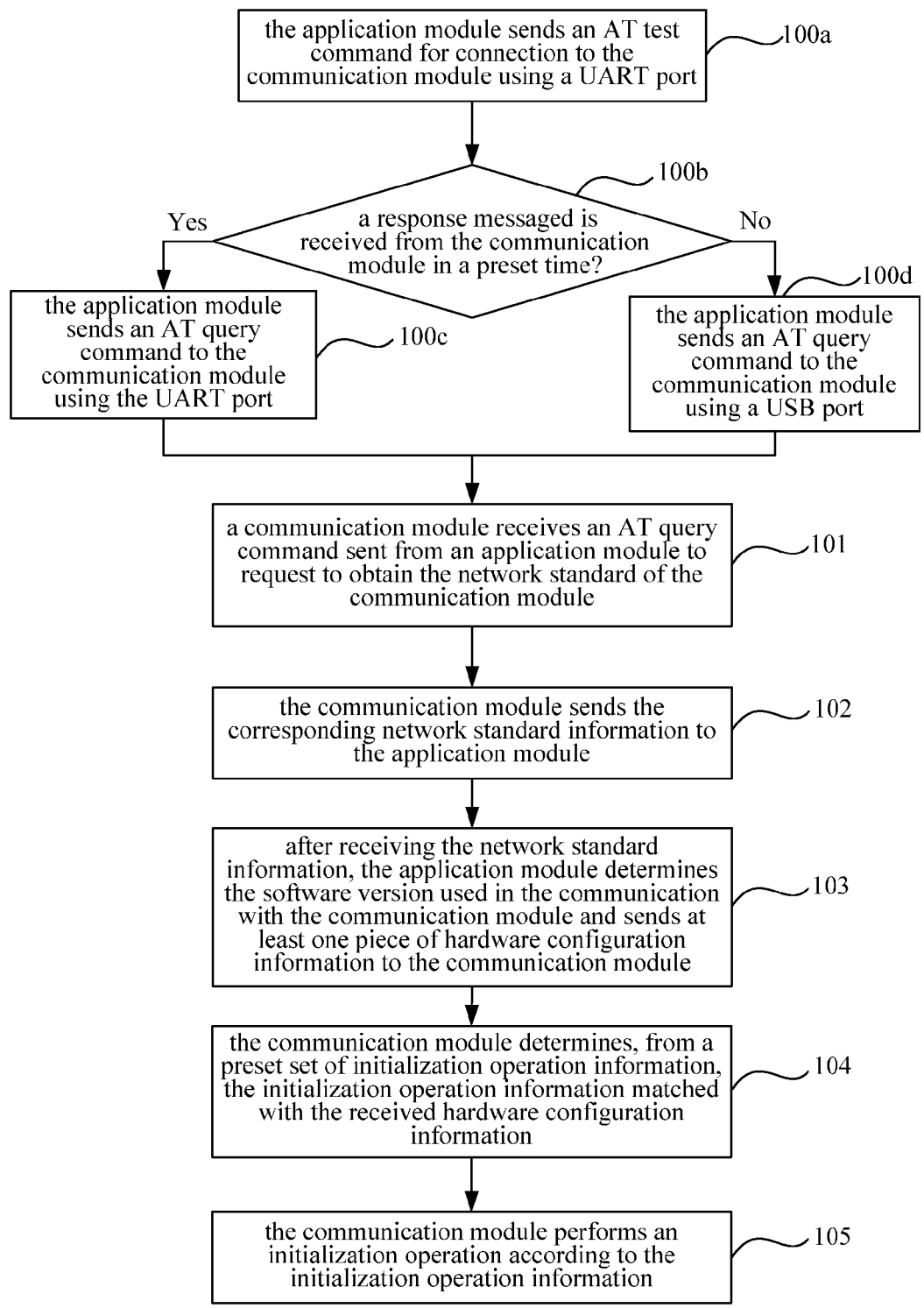
FIG. 1 is a schematic diagram illustrating a method for initializing an internet device according to embodiment 1 of this disclosure.

FIG. 1 is a schematic diagram illustrating a method for initializing an internet device according to embodiment 1 of this disclosure. As shown in FIG. 1, the method comprises the following steps.

Step 101: a communication module receives an AT query command sent from an application module, wherein the AT query command is used for requesting to obtain the network standard of the communication module.

In embodiment 1, the application module is a module in the internet device capable of realizing a plurality of service functions, and the communication module is a built-in or externally-connected module that can be connected with a radio communication network. The network standard of the communication module, which changes with the network that the communication module can connect with, comprises but is not limited to: the network standard of CDMA 2000 and that of a WCDMA network.

Step 102: the communication module sends network standard information corresponding to the communication module, to the application module.

Step 103: after receiving the network standard information, the application module determines the software version used in the communication with the communication module, and sends at least one piece of hardware configuration information to the communication module.

The hardware configuration information is determined by the application module according to the application scenario in which a communication service is executed. An application scenario is corresponding to a specific piece of hardware configuration information, and the hardware configuration information comprises but is not limited to at least one of: the number of the General Purpose Input/Output (GPIO) ports for connection between the application module and the communication module, effective level information, the connection/disconnection condition of a USB port when the internet device is in a sleep mode and voice channel information.

In embodiment 1, the hardware configuration information needed to realize a network service using a radio communication network is different in different application scenarios. For instance, in some application scenarios, the number of the needed GPIO ports is N, the effective level information is that the descending edge of a low level is effective, and the voice channel is a Pulse-Code Modulation (PCM) port for transmitting digital audio. And, in some other application scenarios, the number of the needed GPIO ports is M, the effective level information is that the ascending edge of a low level is effective, and the voice channel is an analog audio LINE_IN/LINE_OUT port.

In Step 103, after determining the network standard information and the hardware configuration information, the application module can perform an initialization operation. It is not limited in this embodiment that the application module performs an initialization operation according to the network standard information and the hardware configuration information only after the communication module performs initialization operation.

Step 104: the communication module determines, from a preset set of initialization operation information, the initialization operation information matched with the received hardware configuration information.

The initialization operation information may be program codes for an initialization operation on a hardware device.

If the hardware configuration information received by the communication module is that the number of GPIO ports is N, the effective level information is that the descending edge of a low level is effective, and the voice channel is a PCM port, then the determined initialization operation information is: the operation information of activating the N GPIO ports, the operation information of setting the descending edge of a low level to be an effective level, and the operation information of activating the PCM port.

Step 105: the communication module performs an initialization operation according to the initialization operation information.

In this step, the communication module calls the determined initialization operation information (that is, the program codes for the initialization operation) to initialize each hardware device.

It should be further noted that before Step 101 is executed and when the internet device is started, both the application module and the communication module enter into a normal startup initialization mode. The application module and the communication module are connected first, and after an AT connection is successfully established between the application module and the communication module, step 101 is executed. Therefore, the following steps may be comprised in the method before Step 101.

Step 100a: the application module sends an AT test command for connection to the communication module using a UART port.

Step 100b: the application module judges whether a response messaged is received from the communication module in a preset time.

Step 100c: if a response messaged is received from the communication module in a preset time, the application module sends an AT query command to the communication module using the UART port and then executes Step 101.

Step 100d: if no response messaged is received from the communication module in a preset time, the application module sends an AT query command to the communication module using a USB port and then executes Step 101.

In step 100d, if no response message is received in a preset time following the initial transmission of the AT test command to the communication module via the UART port, then one of the following two operations may be carried out:

Operation 1: a USB port is used to realize the communication between the application module and the communication module after determining that the UART port is not connected between the two modules.

Operation 2: the AT query command is retransmitted using a UART port, whether the retransmission times exceed a threshold is judged, and a USB port is used to realize the communication if no response message is received and the retransmission times reaches the threshold (e.g. three times), or the AT query command is sent to the communication module using the UART port if a response message is received before the retransmission times reaches the threshold.

By the solution provided in embodiment 1, during the initialization configuration of the application module and the communication module, the communication module is not required to develop different software versions corresponding to different hardware ports and parameters. But, it is only required to directly perform initialization configuration to the hardware network device of the communication module according to the hardware configuration information sent by the application module. It reduces the workload of software development, lowers the complexity of system maintenance and management, and the application module can use the same set of codes to adapt to communication modules of different network standards.

Embodiment 2

Figure 2:
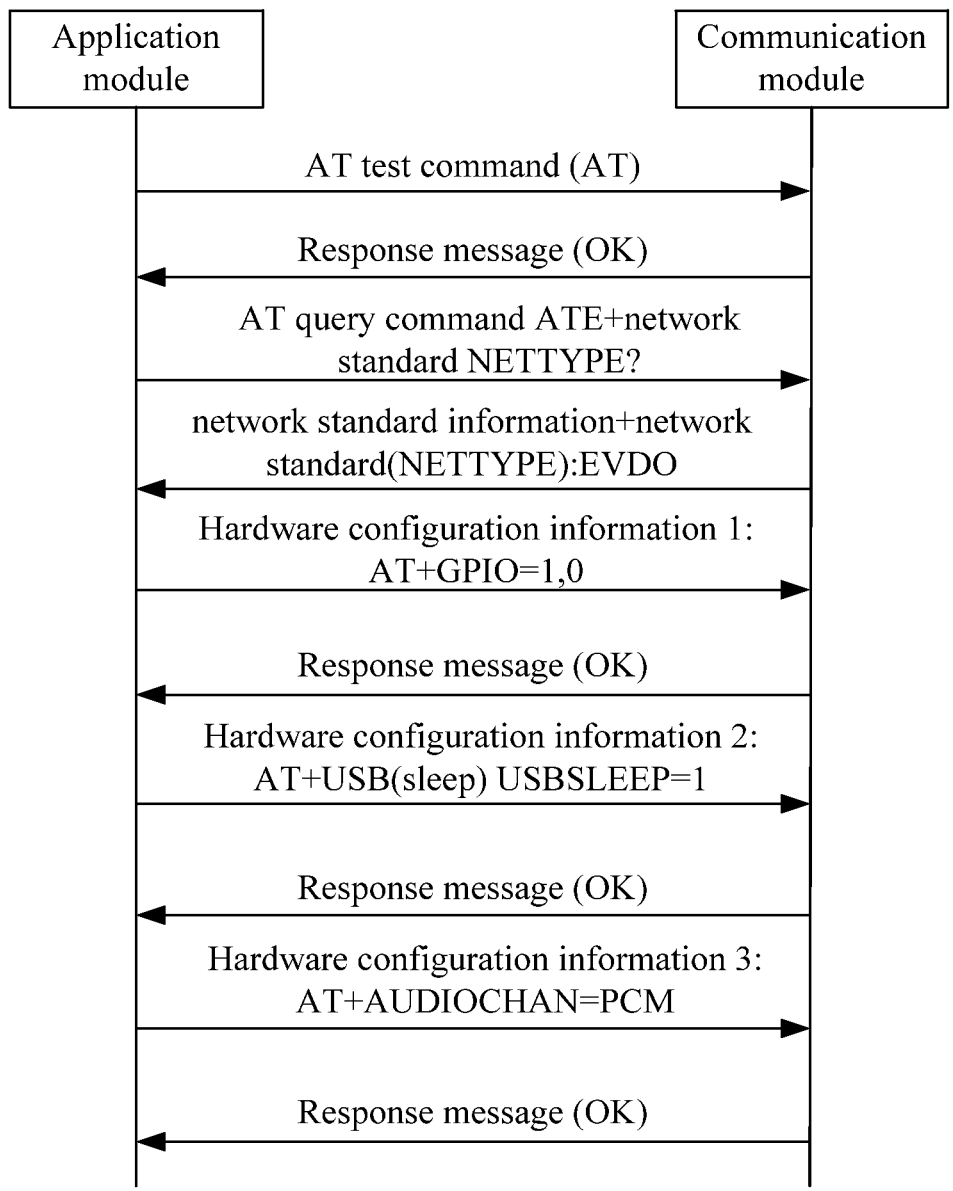
FIG. 2 is a schematic diagram illustrating a method for initializing an internet device according to embodiment 2 of this disclosure.

The solution provided in the embodiment 1 is described in detail in embodiment 2 with reference to a specific example. It is assumed that the network standard of the communication module is EVDO standard in this embodiment. As shown in FIG. 2, the solution provided in this embodiment comprises the following steps.

Step 1: the application module sends an AT test command (AT) to the communication module using the UART port to query whether the channel between the application module and the communication module is normal.

Step 2: the communication module returns a response message (OK) to the application module if the connection channel of the UART port between the application module and the communication module is normal.

Step 3: the application module sends an AT query command (ATE+NETTYPE?) to the communication module using the UART port to request to obtain the network standard of the communication module.

Step 4: the communication module returns the network standard information of itself (+NETTYPE:EVDO) to the application module to indicate that the network standard thereof is EVDO.

Step 5: the application module sends, through an AT configuration command, hardware configuration information 1: AT+GPIO=1,0, wherein the first parameter 1 represents 4 GPIO ports, and the second parameter 0 represents that the low level or descending edge of the GPIO ports is effective.

Step 6: the communication module returns a response message (OK), and calls the code that activates the GPIO ports, and the code that sets that the descending edge of the low level is effective.

Step 7: the application module sends, through an AT configuration command, hardware configuration information 2: AT+USBSLEEP=1, to indicate that the USB connection is disconnected when the internet device is in a sleep mode.

Step 8: the communication module returns a response message (OK) and sets codes for the disconnection of a USB connection when the internet device is in a sleep mode.

In this step, a USB connection is disconnected when the internet device is in a sleep mode, thereby standby current is lowered deliberately.

Step 9: the application module sends, through the AT configuration command, hardware configuration information 3: AT+AUDIOCHAN=PCM, to indicate the transmission of voice through a PCM port.

Step 10: the communication module returns a response message (OK), and calls the code that activates the PCM port; that is, set the audio channel parameter to be the PCM port.

This embodiment is not limited to the EVDO network standard and the corresponding hardware configuration information provided here. The solution of this embodiment is also suitable for corresponding hardware configuration information of other network standards, for example the hardware configuration information in the following network standards.

The hardware configuration information in the first network standard:

The communication module is in accordance with the EVDO network standard; the communication module activates two GPIO ports; AP_SLEEP is set to query the sleep state of an application module, and a high level represents that the application module is in a sleep state; MODULE_WAKEUP_AP is set to enable the communication module to awaken the application module in the sleep state; a USB port is connected with an internet device in the sleep state; audio is transmitted via a LINE_IN/LINE_OUT port; and an AT command and data are transmitted between the communication module and the application module using a USB port.

The hardware configuration information in the second network standard:

The communication module is in accordance with the WCDMA network standard; the communication module activates four GPIO ports; AP_SLEEP is set to query the sleep state of an application module, and a high level represents that the application module is in a sleep state; MODULE_SLEEP is set to query the sleep state of the communication module, and a high level represents that the communication module is in a sleep state; MODULE_WAKEUP_AP is set to enable the communication module to awaken the application module in the sleep state; AP_WAKEUP_MODULE is set to enable the application module to awaken the communication module in the sleep state; a USB port is disconnected with an internet device in the sleep state; audio is transmitted via a PCM port; and the transmission of an AT command between the communication module and the application module is achieved by a UART port, and the data transmission between the communication module and the application module is achieved by a USB port.

Embodiment 3

Figure 3:
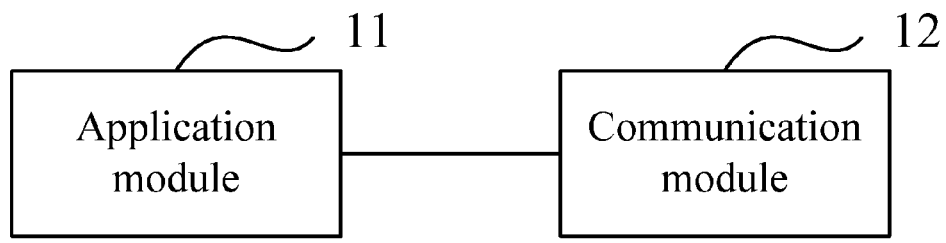
FIG. 3 is a schematic diagram illustrating the structure of a system for initializing an internet device according to embodiment 3 of this disclosure.

Embodiment 3 of this disclosure further provides a system for initializing an internet device based on the same concept of the embodiments 1 and 2 above. As shown in FIG. 3, the system comprises an application module 11 and a communication module 12, wherein the application module 11 is configured to send an AT query command to the communication module, and send at least one piece of hardware configuration information to the communication module after receiving the network standard information returned from the communication module; and the communication module 12 is configured to receive the AT query command, send corresponding network standard information to the application module, and after receiving the hardware configuration information, determine, from a preset set of initialization operation information, the initialization operation information matched with the received hardware configuration information, and perform an initialization operation according to the initialization operation information.

The application module 11 is further configured to: send an AT test command set for connection to the communication module using a UART port, judge whether a response message is received from the communication module in a preset time, and if yes, send an AT query command to the communication module using the UART port, if no, send an AT query command to the communication module using a USB port.

Embodiment 4

Figure 4:
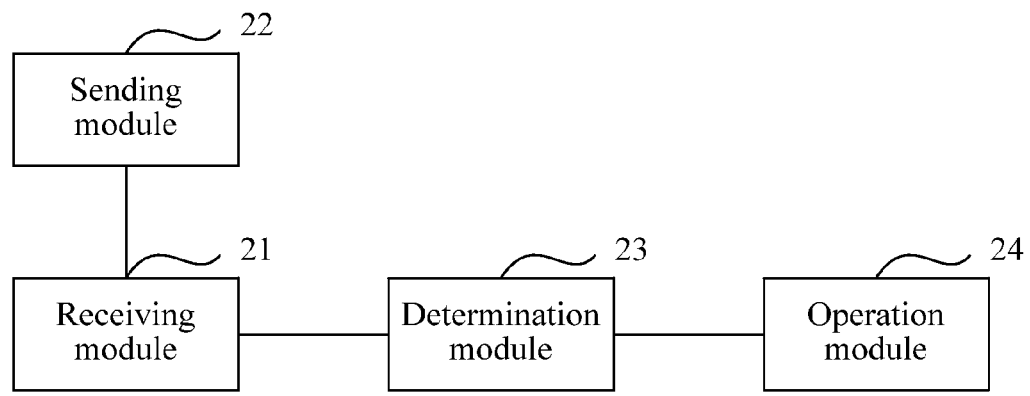
FIG. 4 is a schematic diagram illustrating the structure of a communication device according to embodiment 4 of this disclosure.

Embodiment 4 of this disclosure further provides a communication device. As shown in FIG. 4, the device comprises a receiving module 21, a sending module 22, a determination module 23 and an operation module 24, wherein the receiving module 21 is configured to receive an AT query command and at least one piece of hardware configuration information, the sending module 22 is configured to send the network standard information corresponding to the communication device according to the received AT query command, the determination module 23 is configured to determine, from a preset set of initialization operation information, the initialization operation information matched with the received hardware configuration information, and the operation module is configured to perform an initialization operation according to the determined initialization operation information.

The hardware configuration information described in this embodiment is determined by the application module according to the network standard corresponding to the received network standard information.

The communication device described in embodiment 4 may be a physical device such as an internet card.

The communication device is the communication module described in embodiments 1-3.

By using the method, system and device according to the embodiments of this disclosure, an application module selects rational hardware configuration information after querying the network standard of a communication module, so that the following voice call, short message transmission and Internet surfing flow of an internet device can be carried out according to the demand of the corresponding network standard. Meanwhile, the application module sends the rational hardware configuration information to the communication module, so that it is not necessary for the communication module to develop a plurality of kinds of hardware configuration information in advance. In this disclosure, the same type of application module is adaptive to communication modules of different network standards, and the same type of communication module is adaptive to internet devices of different hardware. Thus, the workload of software development is reduced, and the complexity of system maintenance and management is lowered. Meanwhile, the same application module is adaptive to communication modules of different network standards using the same set of codes.

It should be appreciated by those skilled in this art that the embodiments of this disclosure may be provided in the form of a method, system or computer program product. Therefore, the embodiments of this disclosure may be realized by complete hardware embodiments, complete software embodiments, or software-hardware combined embodiments. Moreover, this disclosure may be realized in the form of a computer program product that is applied to one or more computer-usable storage mediums (including, but not limited to disk memory, CD-ROM or optical memory) in which computer-usable program codes are contained.

This disclosure is illustrated with reference to the flow chart and/or the block diagrams of the method, device (system) and computer program product according to the embodiments of this disclosure. It should be appreciated that each flow in the flow chart and/or each block in the block diagram and/or the combination of the flows in the flow chart and the blocks in the block diagram may be realized by computer program instructions. These computer program instructions may be provided to a general-purpose computer, a special purpose computer, an embedded processor or processors of other programmable data processing devices to generate a machine which makes the instructions executed by the processors of the computers or the processors of other programmable data processing devices generate a device for realizing the functions specified in one or more flows of the flow chart or one or more blocks in the block diagram.

These computer program instructions may also be stored in a computer-readable memory which is capable of guiding a computer or another programmable data processing device to work in a given manner, thereby enabling the instructions stored in the computer-readable memory to generate a product including an instruction device for realizing the functions specified in one or more flows of the flow chart or one or more blocks in the block diagram.

These computer program instructions may also be loaded to a computer or other programmable data processing devices to execute a series of operations thereon to generate the processing realized by the computer so that the instructions executed by the computer or other programmable data processing devices offer the steps for realizing the functions specified in one or more flows of the flow chart or one or more blocks in the block diagram.

While preferred embodiments have been described herein, variations and modifications may be made on these embodiments once those skilled in the art know the basic creative concept of this disclosure. Thus, the accompanying claims is intended to cover the preferred embodiments and all the variations and modifications that fall within the scope of this disclosure.

Apparently, various modifications and variations can be devised by those skilled in the art without departing from the spirit and scope of this disclosure. Thus, this disclosure is intended to cover such modifications and variations that fall within the scope of the claims and the equivalents thereof.

What is claimed is:

1. A method for initializing an internet device, comprising steps of:
    a communication module sending network standard information corresponding to the communication module, to an application module according to an AT query command received from the application module;
    the communication module receiving at least one piece of hardware configuration information from the application module, and determining, from a preset set of initialization operation information, initialization operation information matched with the received hardware configuration information; and
    the communication module performing an initialization operation according to the determined initialization operation information,
    wherein before the communication module sending network standard information corresponding to the communication module, to the application module according to the AT query command received, the method further comprises steps of:
    the application module sending an AT test command set for connection to the communication module using a Universal Asynchronous Receiver/Transmitter (UART) port, and determining whether a response message is received from the communication module in a preset time; and
    if yes, sending an AT query command to the communication module using the UART port;
    if no, sending an AT query command to the communication module using a Universal Serial Bus (USB) port.

2. The method according to claim 1, wherein the step of sending the AT query command to the communication module using the USB port further comprises: the application module retransmitting the AT query command to the communication module using the UART port, judging whether the retransmission times reaches a threshold, and if the threshold is reached and no response message is received, sending the AT query command to the communication module using the USB port.

3. The method according to any one of claims 1, or 2, wherein the hardware configuration information comprises at least one of:
    the number of the General Purpose Input/Output (GPIO) ports for connection between the application module and the communication module, effective level information, the connection/disconnection condition of the USB port when the internet device is in a sleep mode and voice channel information.

4. A system for initializing an internet device, comprising an application module and a communication module, wherein
    the application module is configured to send an AT query command to the communication module, and send at least one piece of hardware configuration information to the communication module after receiving the network standard information returned from the communication module; and
    the communication module is configured to receive the AT query command, send network standard information corresponding to the communication module, to the application module, and after receiving the hardware configuration information, determine, from a preset set of initialization operation information, initialization operation information matched with the received hardware configuration information, and perform an initialization operation according to the initialization operation information,
    wherein the application module is further configured to: send an AT test command set for connection to the communication module using a UART port, judge whether a response message is received from the communication module in a preset time, and
    if yes, send an AT query command to the communication module using the UART port,
    if no, send an AT query command to the communication module using a USB port.

5. The system according to claim 4, wherein the application module is further configured to retransmit the AT query command to the communication module using the UART port, judge whether the retransmission times reaches a threshold, and if the threshold is reached and no response message is received, send the AT query command to the communication module using the USB port.

6. The system according to claim 4, wherein the hardware configuration information comprises at least one of:
    the number of the General Purpose Input/Output (GPIO) ports for connection between the application module and the communication module, effective level information, the connection/disconnection condition of the USB port when the internet device is in a sleep mode and voice channel information.

7. A communication device, comprising:
    a receiving module, configured to receive an AT query command and at least one piece of hardware configuration information;

a sending module, configured to send network standard information corresponding to the communication device according to the received AT query command;

a determination module, configured to determine, from a preset set of initialization operation information, initialization operation information matched with the received hardware configuration information; and an operation module, configured to perform an initialization operation according to the determined initialization operation information, wherein the application module is further configured to:
send an AT test command set for connection to the communication module using a UART port, judge whether a response message is received from the communication module in a preset time, and if yes, send an AT query command to the communication module using the UART port, if no, send an AT query command to the communication module using a USB port.

8. The communication device according to claim 7, wherein the hardware configuration information comprises at least one of: the number of the General Purpose Input/Output (GPIO) ports for connection between the application module and the communication module, effective level information, the connection/disconnection condition of the USB port when the internet device is in a sleep mode and voice channel information.

9. The system according to claim 5, wherein the hardware configuration information comprises at least one of:

the number of the General Purpose Input/Output (GPIO) ports for connection between the application module and the communication module, effective level information, the connection/disconnection condition of the USB port when the internet device is in a sleep mode and voice channel information.

* * * * *